US008472395B2

(12) United States Patent
Anderson et al.

(10) Patent No.: US 8,472,395 B2
(45) Date of Patent: *Jun. 25, 2013

(54) APPARATUS AND METHOD FOR COMMUNICATING UPLINK SIGNALING INFORMATION

(75) Inventors: Nicholas William Anderson, Bristol (GB); Martin Warwick Beale, Avon (GB); Peter Jonathon Legg, Bristol (GB)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/330,190

(22) Filed: Dec. 19, 2011

(65) Prior Publication Data

US 2012/0093135 A1    Apr. 19, 2012

Related U.S. Application Data

(63) Continuation of application No. 12/755,775, filed on Apr. 7, 2010, now Pat. No. 8,149,778, which is a continuation of application No. 11/241,644, filed on Sep. 30, 2005, now Pat. No. 7,701,901.

(30) Foreign Application Priority Data

May 3, 2005    (GB) .................................. 0508799.4

(51) Int. Cl.
 *H04W 4/00*    (2009.01)
 *H04W 72/00*    (2009.01)
(52) U.S. Cl.
 USPC .......................................... 370/329; 455/450
(58) Field of Classification Search
 None
 See application file for complete search history.

(56) References Cited

U.S. PATENT DOCUMENTS

| 6,778,509 B1 | 8/2004 | Ravishankar et al. |
| 6,904,290 B1 | 6/2005 | Palenius |
| 6,993,342 B2 | 1/2006 | Kuchibhotla et al. |
| 7,042,856 B2 | 5/2006 | Walton et al. |

(Continued)

FOREIGN PATENT DOCUMENTS

| EP | 1 418 786 A1 | 5/2004 |
| WO | WO 2005078967 | 8/2005 |

OTHER PUBLICATIONS

"Universal Mobile Telecommunications System (UMTS); Medium Access Control (MAC) protocol specification (3GPP TS 25.321 version 4.3.0 Release 4)," Dec. 2001, 3GPP, ETSI TS 125 321 V4.3.0, pp. 1-46.

(Continued)

*Primary Examiner* — Marcus R Smith
(74) *Attorney, Agent, or Firm* — Oblon, Spivak, McClelland, Maier & Neustadt, L.L.P.

(57) ABSTRACT

A User Equipment, UE, of a cellular communication system transmits scheduling assistance data to a base station comprising a base station scheduler which schedules uplink packet data. The scheduling assistance data relates to uplink packet data transmission from the UE. The UE comprises a channel controller which is operable to cause the scheduling assistance data to be transmitted from the UE to the base station in a first physical resource of an uplink air interface. The first physical resource is not managed by the base station based scheduler. The scheduling assistance data may specifically be transmitted in a first transport channel multiplexed with other transport channels on a physical resource. The transport channels may be individually optimized and may have different termination points and transmission reliabilities. Specifically, the transport channel supporting the scheduling assistance data signaling may have a high reliability and be terminated in the base station.

25 Claims, 4 Drawing Sheets

U.S. PATENT DOCUMENTS

| | | | |
|---|---|---|---|
| 7,701,901 | B2 | 4/2010 | Anderson et al. |
| 2003/0064728 | A1 | 4/2003 | Speight |
| 2004/0192308 | A1 | 9/2004 | Lee et al. |
| 2004/0219919 | A1 | 11/2004 | Whinnett et al. |
| 2005/0047393 | A1 | 3/2005 | Liu |
| 2005/0053035 | A1 | 3/2005 | Kwak et al. |
| 2005/0207359 | A1 | 9/2005 | Hwang et al. |
| 2005/0220058 | A1 | 10/2005 | Garg |
| 2006/0128410 | A1 | 6/2006 | Derryberry et al. |
| 2006/0251031 | A1 | 11/2006 | Anderson et al. |
| 2006/0256756 | A1 | 11/2006 | Wakabayashi |
| 2007/0150788 | A1 | 6/2007 | Zhuyan |
| 2007/0189282 | A1 | 8/2007 | Lohr et al. |

OTHER PUBLICATIONS

3rd Generation Partnership Project, Technical Specification Group Services and System Aspects, Technical Specifications and Technical Reports for a UTRAN-based 3GPP system, (Release 6) 3GPP TS 21.101 V6.2.0 (Jun. 2005).

3rd Generation Partnership Project, Technical Specification Group Services and System Aspects, Evolution of 3GPP System, (Release 6) 3GPP TR 21.902 V6.0.0 (Sep. 2003).

3rd Generation Partnership Project, Technical Specification Group Services and System Aspects, Network Architecture (Release 6) 3GPP TS 23.002 V6.8.0 (Jun. 2005).

3rd Generation Partnership Project, Technical Specification Group Radio Access Network, User Equipment (UE) radio transmission and reception (FDD) (Release 6) 3GPP TS 25.101 V6.8.0 (Jun. 2005).

3rd Generation Partnership Project, Technical Specification Group Radio Access Network, User Equipment (UE) radio transmission and reception (TDD) (Release 6) 3GPP TS 25.102 V6.1.0 (Jun. 2005).

3rd Generation Partnership Project, Technical Specification Group Radio Access Network, Base Station (BS) radio transmission and reception (FDD) (Release 6) 3GPP TS 25.104 V6.9.0 (Jun. 2005).

3rd Generation Partnership Project, Technical Specification Group Radio Access Network, Base Station (BS) radio transmission and reception (TDD) (Release 6) 3GPP TS 25.105 V6.2.0 (Dec. 2004).

3rd Generation Partnership Project, Technical Specification Group Radio Access Network, Physical channels and mapping of transport channels onto physical channels (FDD) (Release 6) 3GPP TS 25.211 V6.5.0 (Jun. 2005).

3rd Generation Partnership Project, Technical Specification Group Radio Access Network, Multiplexing and channel coding (FCD) (Relese 6) 3GPP TS 25.212 V6.5.0 (Jun. 2005).

3rd Generation Partnership Project, Technical Specification Group Radio Access Network, Spreading and modulation (FDD) (Release 6) 3GPP TS 25.213 V6.3.0 (Jun. 2005).

3rd Generation Partnership Project, Technical Specification Group Radio Access Network, Physical layer procedures (FDD) (Release 6) 3GPP TS 25.214 V6.6.0 (Jun. 2005).

3rd Generation Partnership Project, Technical Specification Group Radio Access Network, Physical layer—Measurements (FDD) (Release 6) 3GPP TS 25.215 V6.3.0 (Jun. 2005).

3rd Generation Partnership Project, Technical Specification Group Radio Access Network, Physical channels and mapping of transport channels onto physical channels (TDD) (Release 6) 3GPP TS 25.221 V6.4.1 (Jun. 2005).

3rd Generation Partnership Project, Technical Specification Group Radio Access Network, Multiplexing and channel coding (TDD) (Release 6) 3GPP TS 25.222 V6.2.0 (Dec. 2004).

3rd Generation Partnership Project, Technical Specification Group Radio Access Network, Spreading and modulation (TDD) (Release 6) 3GPP TS 25.223 V6.0.0 (Dec. 2003).

3rd Generation Partnership Project, Technical Specification Group Radio Access Network, Physical layer procedures (TDD) (Release 6) 3GPP TS 25.224 V6.5.0 (Jun. 2005).

3rd Generation Partnership Project, Technical Specification Group Radio Access Network, Physical layer. Measurements (TDD) (Release 6) 3GPP TS 25.225 V6.1.0 (Mar. 2004).

3rd Generation Partnership Project, Technical Specification Group Radio Access Network, FDD Enhanced Uplink, Overall description, Stage 2 (Release 6) 3GPP TR 25.309 V6.3.0 (Jun. 2005).

3rd Generation Partnership Project, Technical Specification Group Radio Access Network, Feasibility Study on Uplink Enhancements for UTRA TDD (Release 6) 3GPP TR 25.804 V2.0.0 (Feb. 2005).

3rd Generation Partnership Project, Technical Specification Group Radio Access Network, FDD Enhanced Uplink, Physical Layer Aspects (Release 6) 3GPP TR 25.808 V2.0.0 (Mar. 2005).

3rd Generation Partnership Project, Technical Specification Group Radio Access Network, Physical layer aspects of UTRA High Speed Downlink Packet Access (Release 4) 3GPP TR 25.848 V4.0.0 (Mar. 2001).

3rd Generation Partnership Project, Technical Specification Group Radio Access Network, FDD Enahnced Uplink, Feasibility Study considering the viable deployment of UTRA in additional and diverse spectrum arrangements (Release 6) 3GPP TR 25.889 V6.0.0 (Jun. 2003).

3rd Generation Partnership Project, Technical Specification Group Radio Access Network, Feasibility Study for Enhanced Uplink for UTRA FDD (Release 6) 3GPP TS 25.896 V6.0.0 (Mar. 2004).

Great Britain Search Report mailed Oct. 26, 2005 for Great Britain Application No. 0508799.4 filed May 3, 2005.

International Search Report mailed May 12, 2006, for PCT Application No. PCT/EP2006/050806 filed Feb. 9, 2006.

3rd Generation Partnership Project, Technical Specification Group Radio Access Network, Feasibility Study on Uplink Enhancements for UTRA TDD; (Release 6) , (Mar. 2005). 3GPP: Valbonne, Francem TS 25.804 v6.0.0:1-56.

"Universal Movile Telecommunications System (UMTS); Medium Access Control (MAC) protocol specification (3GPP TS 25.321 version 6.3.0 Release 6)," (Dec. 2004). ETSI TS 125 321 v6.3.0:1-75.

IPWireless, (Aug.-Sep. 2, 2005). "Uplink Signaling Architecture of 3.84Mcps TDD Enhanced Uplink," 3GPP TSG RAN WG2#48, Tdoc 42-051769, London, England.

Holma, H. et al. eds. (2001). WCDMA for UMTS: Radio Access for Third Generation Mobile Communications. John Wiley & Sons Ltd.: West Sussex, England (Table of Contents).

U.S. Appl. No. 13/270,689, filed Oct. 11, 2011, Anderson, et al.

APPARATUS AND METHOD FOR COMMUNICATING UPLINK SIGNALING INFORMATION

CROSS-REFERENCE TO RELATED APPLICATIONS

This application is a continuation of U.S. application Ser. No. 12/755,775, filed Apr. 7, 2010, which is a continuation of U.S. application patent Ser. No. 7,701,901, filed Sep. 30, 2005, which claims the benefit of United Kingdom application GB 0508799.4, filed May 3, 2005, the contents of each of which are incorporated herein by reference.

The invention relates to a signaling of scheduling assistance data in a cellular communication system and in particular, but not exclusively, to signaling in a $3^{rd}$ Generation Partnership Project (3GPP) cellular communication system.

BACKGROUND ART

Currently, 3rd generation cellular communication systems are being rolled out to further enhance the communication services provided to mobile users. The most widely adopted 3rd generation communication systems are based on Code Division Multiple Access (CDMA) and Frequency Division Duplex (FDD) or Time Division Duplex (TDD). In CDMA systems, user separation is obtained by allocating different spreading and/or scrambling codes to different users on the same carrier frequency and in the same time intervals. In TDD user separation is achieved by assigning different time slots to different users in a similar way to TDMA. However, in contrast to TDMA, TDD provides for the same carrier frequency to be used for both uplink and downlink transmissions. An example of a communication system using this principle is the Universal Mobile Telecommunication System (UMTS). Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876.

In order to provide enhanced communication services, the 3rd generation cellular communication systems are designed for a variety of different services including packet based data communication. Likewise, existing $2^{nd}$ generation cellular communication systems, such as the Global System for Mobile communications (GSM) have been enhanced to support an increasing number of different services. One such enhancement is the General Packet Radio System (GPRS), which is a system developed for enabling packet data based communication in a GSM communication system. Packet data communication is particularly suited for data services which have a dynamically varying communication requirement such as for example Internet access services.

For cellular mobile communication systems in which the traffic and services have a non-constant data rate, it is efficient to dynamically share radio resources amongst users in accordance with their needs at a particular instant. This is in contrast to services with constant data rates, where radio resources appropriate for the service data rate can be assigned on a long-term basis such as for the duration of the call.

In the current UMTS TDD standards, uplink shared radio resources may be dynamically assigned (scheduled) by a scheduler in a Radio Network Controller (RNC). However, in order to operate efficiently, the scheduler needs to have knowledge of the volume of uplink data which is waiting for uplink transmission at the individual mobile users. This allows the scheduler to assign resources to users who need them most and in particular prevents that resource is wasted by being assigned to mobile stations that do not have any data to send.

A further aspect of efficient scheduling is the consideration of user radio channel conditions. A user for whom the radio path gain to another cell is similar to the radio path gain to the current serving cell may cause significant interference in the other cell. It can be shown that system efficiency may be significantly improved if the scheduler takes into account the relative path gains from the user to each cell in the particular locale of the network. In such schemes, the power of transmissions by users for whom the path gain to one or more non-serving cells is of similar magnitude to the path gain to the current serving cell is restricted such that the inter-cell interference caused is controlled and managed. Conversely, the transmit power of transmissions by users for whom the path gain to the serving cell is far greater than that to other cells is relatively less restricted since the inter-cell interference caused by such users per unit of transmission power is less.

In practical systems, both the radio conditions and the pending data volume status may change very rapidly. In order to optimize system efficiency as these changes occur, it is important that the scheduler in the network is informed of the very latest conditions such that timely adjustment of the scheduler operation may be effected.

For example, during a typical active session, there will be periodic spurts of uplink data to send (for example when sending an email, sending completed Internet forms, or when sending TCP acknowledgements for a corresponding downlink transfer, such as a web page). These short data spurts are known as packet calls, and their duration may span from typically a few milliseconds to a few seconds. During a packet call, uplink resources are being frequently allocated and it is efficient for the buffer volume and radio channel information to be piggybacked on these uplink transmissions to continually update the scheduler as to the data sending needs of the user. However, once the packet call has completed (all data to send has been sent and the transmission buffer is temporarily empty), allocation of uplink resources is suspended. In this situation, means for informing the scheduler of the arrival of new data (at the start of a new packet call) must be found. It is important to minimize any delay in this signaling since this contributes directly to the user-perceived transmission speed.

Release 99 of the Technical Specifications for 3GPP UMTS TDD, define a layer 3 message termed the PUSCH (Physical Uplink Shared Channel) Capacity Request (PCR) message. The logical channel carrying PCR (termed the Shared Channel Control Channel—SHCCH) may be routed to different transport channels depending on the presence of available resources. For example, the PCR message may be sent on the Random Access CHannel (RACH) which is terminated within the RNC. As another example, if the resources are available, the PCR may also in some cases be sent on the Uplink Shared CHannel (USCH).

However, although this approach is suitable for many applications it is not optimal for many other applications. For example, the defined signaling is aimed at providing scheduling information to RNC based schedulers and is designed for this application, and is in particular designed with a dynamic performance and delay suited for this purpose. Specifically, the signaling is relatively slow and the allocation response by the RNC scheduler is not particularly fast due to the delays associated with communication between the base station and the RNC (over the Lib interface) and the protocol stack delay in receiving the PCR and transmitting the allocation grant message via peer-to-peer layer 3 signaling.

Recently, significant effort has been invested in improving uplink performance for 3GPP systems. One way to do this is to move the scheduling entity out of the RNC and into the base stations such that transmission and retransmission latencies may be reduced. As a result, a much faster and more efficient scheduling can be achieved. This in turn increases perceived end-user throughput. In such an implementation, a scheduler located in the base station (rather than in the RNC) assumes control over the granting of uplink resources. Fast scheduling response to user's traffic needs and channel conditions is desirable in improving the efficiency of the scheduling and the transmission delays for the individual UEs.

However, as the efficiency of the scheduling activity relies on sufficient information being available, the requirements for the signaling functionality become increasingly severe. Specifically, the existing approach wherein signaling is transmitted to the RNC by layer 3 signaling, is inefficient and introduces delays which limit the scheduling performance of a base station based scheduler. In particular, using techniques identical to the prior art (such as the use of PCR messages) are not attractive due to the fact that the transport channels used are terminated in the RNC—the signaling information thus ends up in a different network entity than that in which the scheduler resides and an additional delay is introduced in communicating this to the base station scheduler.

For example, in a 3GPP TDD system, timely updates on radio channel conditions are especially important due to the fact that the uplink and downlink radio channels are reciprocal. As such, if the user is able to inform the network scheduler of the very latest channel conditions (as e.g. measured on the downlink), and the scheduler is able to respond with minimal delay, then the scheduler may exploit the reciprocity and assume that the radio channel conditions will be relatively unchanged by the time an uplink transmission is scheduled and transmitted. The channel conditions that may be reported by a mobile station may include the channel conditions for the cell of the scheduler but may also include channel conditions relating to other cells thereby allowing a fast and efficient scheduling taking into account the instantaneous conditions for other cells and the resulting intercell interference caused.

As another example, in 3GPP FDD systems, mobile station buffer volume status is signalled within the uplink transmissions themselves. The data is contained within the same Protocol Data Unit (PDU) as the other uplink payload data— specifically in the MAC-e PDU header. However, this means that the signaling information is dependent on the performance and characteristics of the uplink data transmissions themselves.

It should also be noted that in this particular method of transmitting signaling data, the signaling data and user data are multiplexed together before forward error correction is applied and consequently both information streams have the same transmission reliabilities. Thus, when retransmissions are required for the (MAC-e) PDU this affects both the signaling and user data and thus introduces an additional delay for the signaling. Furthermore, data retransmissions are commonplace for uplink systems where hybrid and fast retransmission schemes are used because the optimum link efficiency (in terms of the energy required per error-free transmitted bit) is achieved when the probability of error for first-time transmissions is relatively high (e.g. 10% to 50%). Thus, uplink signaling techniques adopted for 3GPP FDD uplink suffer from latencies which, if applied to a TDD uplink system, may significantly degrade the, performance of that TDD system with respect to the level of performance that is achievable.

Hence, an improved signaling in a cellular communication system would be advantageous and in particular a system allowing increased flexibility, reduced signaling delay, improved scheduling, suitability for base station based scheduling and/or improved performance would be advantageous.

SUMMARY OF THE INVENTION

Accordingly, the Invention seeks to preferably mitigate, alleviate or eliminate one or more of the abovementioned disadvantages singly or in any combination.

According to a first aspect of the invention there is provided an apparatus for transmitting uplink signaling information in a cellular communication system; the apparatus comprising: means for generating scheduling assistance data for a base station based scheduler, the scheduling assistance data relating to uplink packet data transmission from a User Equipment, UE; means for transmitting the scheduling assistance data from the UE in a first physical resource of an uplink air interface; wherein the first physical resource is not managed by the base station based scheduler.

The invention may allow improved scheduling by a base station based scheduler resulting in an improved performance of the cellular communication system as a whole. The invention may allow improved performance as perceived by the end-users. The invention may e.g. provide increased capacity, reduced delays and/or increased effective throughput. The invention may allow a flexible signaling and may allow the scheduling assistance data to be provided with short delays. The invention may in particular provide for signaling of scheduling assistance data which is particularly suitable for a scheduler based in a base station.

The data on the first physical resource is not scheduled by the base station based scheduler. Rather the data on the first physical resource may for example be scheduled by a scheduler of the RNC supporting the base station of the base station based scheduler. The first physical resource may be a resource which the base station based scheduler does not have any controlling relationship with and/or information of. A physical resource may for example be a group of one or more physical channels of the cellular communication system. The uplink packet data transmissions of the UE may be for a shared uplink packet data service and/or channel.

The apparatus for receiving uplink signaling information may be the User Equipment.

According to an optional feature of the invention, the means for transmitting is arranged to transmit the scheduling assistance data on a first transport channel supported by the first physical resource.

This may allow an efficient implementation and may provide compatibility with many existing cellular communication systems.

According to an optional feature of the invention, the first transport channel is a base station terminated transport channel terminated in a base station of the base station based scheduler.

This may allow improved scheduling and may in particular allow a faster and lower complexity signaling of scheduling assistance data. In particular, in existing cellular communication systems, a new transport channel may be introduced which is particularly suitable for scheduling performed at a base station.

According to an optional feature of the invention, the means for transmitting is arranged to transmit other data on a second transport channel multiplexed on to the first physical resource with the first transport channel.

This may allow increased flexibility, efficiency and/or performance. The feature may allow a practical use of physical resources and may allow an efficient signaling of the scheduling assistance data using a physical resource that may be used for other purposes. Additionally or alternatively, it may allow an optimization of the transmission characteristics for the scheduling assistance data with reduced restrictions imposed by the requirements for the transmission of the other data.

According to an optional feature of the invention, the first transport channel has a different termination point than the second transport channel.

The first transport channel may be terminated in a different network entity than the second transport channel. For example, the first transport channel may be terminated at the base station while the second transport channel is terminated at an RNC. The feature may allow a particularly suitable signaling system and may allow faster signaling of scheduling assistance data and thus improved scheduling while allowing efficient sharing of resources with other communications managed from a different location.

According to an optional feature of the invention, the second transport channel employs a retransmission scheme and the first transport channel does not employ a retransmission scheme.

This may allow improved performance and may in particular allow efficient communication of other data while ensuring fast transmission for the scheduling assistance data.

According to an optional feature of the invention, the first transport channel is encoded in accordance with a first transmission scheme and the second transport channel is encoded in accordance with a different second transmission scheme.

The first and second transport channels may be transmitted with different transmission reliabilities such that the error rates are different for the scheduling assistance data and the other uplink data. This may in particular allow efficient scheduling by reducing delay while allowing an efficient air interface resource usage for other data.

According to an optional feature of the invention, the first transmission scheme and the second transmission scheme comprise different error correcting characteristics.

This may allow improved performance and a practical implementation.

According to an optional feature of the invention, the means for transmitting is arranged to perform rate matching of the first transport channel and the second transport channel.

The rate matching may be performed in order to adjust the error correcting capability of the first and second transport channels. This may allow improved performance and a practical implementation.

According to an optional feature of the invention, the apparatus further comprises means for transmitting the scheduling assistance data using a second physical resource and selection means for selecting between the first physical resource and the second physical resource.

This may improve performance and may allow a communication of the scheduling assistance data which is particularly suitable for the current conditions and the current characteristics of the physical resources. For example, in a 3GPP system, the apparatus may select between a physical random access channel (e.g. PRACH), a dedicated physical channel (e.g. DPCH) and/or an uplink channel scheduled by the base station based scheduler.

According to an optional feature of the invention, the selection means is arranged to select between the first physical resource and the second physical resource in response to an availability of the first physical resource and the second physical resource.

This may allow efficient signaling and may for example allow scheduling assistance data to be communicated on currently available resources thus allowing a dynamic system wherein the scheduling assistance data is communicated on different resources as and when they are available. Such an arrangement may in particular allow the signaling delay to be substantially reduced. For example, in a 3GPP system, the apparatus may select between a random access physical channel (e.g. PRACH), a dedicated physical channel (e.g. DPCH) and/or an uplink channel scheduled by the base station based scheduler depending on which of these channels are currently set up. The availability may for example be a duration since the physical resource was available.

According to an optional feature of the invention, the selection means is arranged to select between the first physical resource and the second physical resource in response to a traffic loading of the first physical resource and the second physical resource.

This may allow efficient signaling and may for example allow scheduling assistance data to be communicated on physical resources that have excess capacity. For example, in a 3GPP system, the apparatus may select between a physical random access channel (e.g. PRACH), a dedicated physical channel (e.g. DPCH) and/or an uplink channel scheduled by the base station based scheduler depending on which of these channels have spare capacity.

According to an optional feature of the invention, the selection means is arranged to select between the first physical resource and the second physical resource in response to a latency characteristic associated with the first physical resource and the second physical resource.

This may allow efficient signaling and may for example allow scheduling assistance data to be communicated on the physical resource that results in the lowest delay for the scheduling assistance data. This may provide improved performance and scheduling due to reduced delay. The latency characteristic may e.g. be an estimated, assumed or calculated delay for transmission of the scheduling assistance data on each physical resource.

According to an optional feature of the invention, the second physical resource is a physical resource managed by the base station based scheduler.

The second physical resource may support data which is scheduled by the base station based scheduler. The second physical resource may specifically support a user data channel for which the base station based scheduler schedules the information. For example, in a 3GPP system, the apparatus may select between a physical random access channel (e.g. PRACH), a dedicated physical channel (e.g. DPCH) controlled by an RNC scheduler and/or a packet data uplink channel which is scheduled by the base station based scheduler.

According to an optional feature of the invention, the first physical resource is associated with a first transport channel and the second physical resource is associated with a second transport channel and the selection means is arranged to allocate the scheduling assistance data by associating the scheduling assistance data with the first or second transport channel.

This may provide a highly advantageous approach and may in particular allow an efficient selection of the appropriate physical resource while allowing individual optimisation of transmission characteristics for the scheduling assistance data. The transport channels may be selected in response to characteristics associated with the physical resource of the transport channel.

According to an optional feature of the invention, the first physical resource is a random access channel. The random access channel may provide a particularly suitable channel as it may be used when no other physical channels are available. The invention may allow scheduling assistance data for a base station based scheduler to be signaled on a random access channel which is not controlled by the base station based scheduler but e.g. by an RNC based scheduler.

According to an optional feature of the invention, the scheduling assistance data comprises an indication of an amount of data pending transmission and/or an indication of air interface channel conditions for the UE. The scheduling assistance data may alternatively or additionally e.g. comprise an indication of a relative transmit power of an uplink transmission of the UE and/or an indication of a user identity associated with the UE. Such information may allow a particularly advantageous scheduling.

According to an optional feature of the invention, the cellular communication system is a $3^{rd}$ Generation Partnership Project, 3GPP, system. The 3GPP system may specifically be a UMTS cellular communication system. The invention may allow improved performance in a 3GPP cellular communication system.

According to an optional feature of the invention, the cellular communication system is a Time Division Duplex system. The invention may allow improved performance in a TDD cellular communication system and may in particular allow improved scheduling by exploiting the improved signaling of channel condition information applicable to both uplink and downlink channels.

According to a second aspect of the invention there is provided an apparatus for receiving uplink signaling information in a cellular communication system; the apparatus comprising: means for receiving scheduling assistance data for a base station based scheduler from the UE in a first physical resource of an uplink air interface, the scheduling assistance data relating to uplink packet data transmission from the User Equipment; wherein the first physical resource is not managed by the base station based scheduler.

It will be appreciated that the optional features, comments and/or advantages described above with reference to the apparatus for transmitting uplink signaling information apply equally well to the apparatus for receiving uplink signaling information and that the optional features may be included in the apparatus for receiving uplink signaling information individually or in any combination.

The apparatus for receiving uplink signaling information may be a base station.

According to a third aspect of the invention there is provided a method of transmitting uplink signaling information in a cellular communication system; the method comprising: generating scheduling assistance data for a base station based scheduler, the scheduling assistance data relating to uplink packet data transmission from a User Equipment, UE; transmitting the scheduling assistance data from the UE in a first physical resource of an uplink air interface; wherein the first physical resource is not managed by the base station based scheduler.

It will be appreciated that the optional features comments and/or advantages described above with reference to the apparatus for transmitting uplink signaling information apply equally well to the method for transmitting uplink signaling information and that the optional features may be included in the method for transmitting uplink signaling information individually or in any combination.

For example, in accordance with an optional feature of the invention, the scheduling assistance data is transmitted on a first transport channel supported by the first physical resource.

As another example, in accordance with an optional feature of the invention, the first transport channel is terminated in a base station of the base station based scheduler.

As another example, in accordance with an optional feature of the invention, the method further comprises transmitting other data on a second transport channel multiplexed on to the first physical resource with the first transport channel.

As another example, in accordance with an optional feature of the invention, the first transport channel is encoded in accordance with a first transmission scheme and the second transport channel is encoded in accordance with a different second transmission scheme.

As another example, in accordance with an optional feature of the invention, the method further comprises transmitting the scheduling assistance data using a second physical resource and selecting between the first physical resource and the second physical resource.

As another example, in accordance with an optional feature of the invention, the second physical resource is a physical resource managed by the base station based scheduler.

As another example, in accordance with an optional feature of the invention, the first physical resource is a random access channel According to a fourth aspect of the invention there is provided a method of receiving uplink signaling information in a cellular communication system; the method comprising: receiving scheduling assistance data for a base station based scheduler from the UE in a first physical resource of an uplink air interface, the scheduling assistance data relating to uplink packet data transmission from the User Equipment; wherein the first physical resource is not managed by the base station based scheduler.

It will be appreciated that the optional features comments and/or advantages described above with reference to the apparatus for transmitting uplink signaling information apply equally well to the method for receiving uplink signaling information and that the optional features may be included in the method for receiving uplink signaling information individually or in any combination.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which

FIG. 3.b illustrates an example of the switching of the signaling information stream into two or more transport channels each of which has a fixed association with a physical resource type.

DETAILED DESCRIPTION OF THE INVENTION

The following description focuses on embodiments of the invention applicable to a UMTS (Universal Mobile Telecommunication System) cellular communication system and in particular to a UMTS Terrestrial Radio Access Network (UTRAN) operating in a Time Division Duplex (TDD) mode. However, it will be appreciated that the invention is not limited to this application but may be applied to many other cellular communication systems including for example a GSM (Global System for Mobile communication system) cellular communication system.

Figure 1:
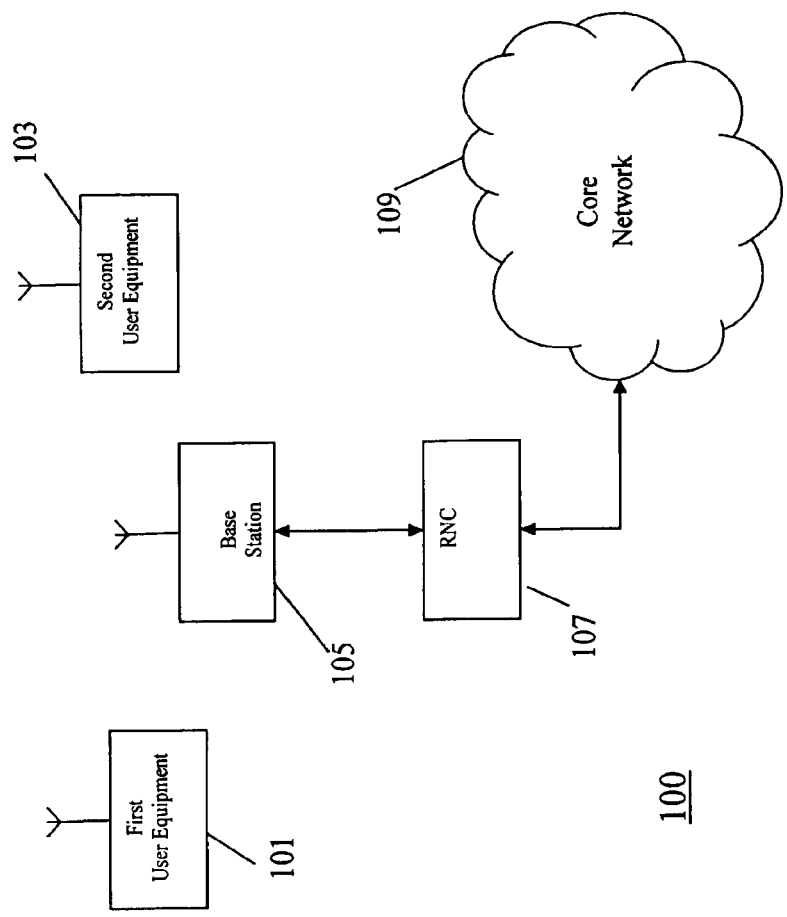
FIG. 1 illustrates an example of a cellular communication system 100 in which embodiments of the invention may be employed.

FIG. 1 illustrates an example of a cellular communication system 100 in which embodiments of the invention may be employed.

In a cellular communication system, a geographical region is divided into a number of cells each of which is served by a base station. The base stations are interconnected by a fixed network which can communicate data between the base stations. A mobile station is served via a radio communication link by the base station of the cell within which the mobile station is situated.

As a mobile station moves, it may move from the coverage of one base station to the coverage of another, i.e. from one cell to another. As the mobile station moves towards a base station, it enters a region of overlapping coverage of two base stations and within this overlap region it changes to be supported by the new base station. As the mobile station moves further into the new cell, it continues to be supported by the new base station. This is known as a A typical cellular communication system extends coverage over typically an entire country and comprises hundreds or even thousands of cells supporting thousands or even millions of mobile stations. Communication from a mobile station to a base station is known as uplink, and communication from a base station to a mobile station is known as downlink.

In the example of FIG. 1, a first User Equipment (UE) 101 and a second UE 103 are in a first cell supported by a base station 105. A UE may be for example a remote unit, a mobile station, a communication terminal, a personal digital assistant, a laptop computer, an embedded communication processor or any communication element communicating over the air interface of the cellular communication system.

The base station 105 is coupled to an RNC 107. An RNC performs many of the control functions related to the air interface including radio resource management and routing of data to and from appropriate base stations.

The RNC 107 is coupled to a core network 109. A core network interconnects RNCs and is operable to route data between any two RNCs, thereby enabling a remote unit in a cell to communicate with a remote unit in any other cell. In addition, a core network comprises gateway functions for interconnecting to external networks such as the Public Switched Telephone Network (PSTN), thereby allowing mobile stations to communicate with landline telephones and other communication terminals connected by a landline. Furthermore, the core network comprises much of the functionality required for managing a conventional cellular communication network including functionality for routing data, admission control, resource allocation, subscriber billing, mobile station authentication etc.

It will be appreciated that for clarity and brevity only the specific elements of the cellular communication system required for the description of some embodiments of the invention are shown, and that the cellular communication may comprise many other elements including other base stations and RNCs as well as other network entities such as SGSNs, GGSNs, HLRs, VLRs etc.

Conventionally, the scheduling of data over the air interface is performed by the RNC. However, recently packet data services have been proposed which seek to exploit the fluctuating channel conditions when scheduling data over a shared channel. Specifically, a High Speed Downlink Packet Access (HSDPA) service is currently being standardised by 3GPP. HSDPA allows scheduling to be performed taken the conditions for the individual UEs into account. Thus, data may be scheduled for UEs when channel propagations allow for this to be communicated with low resource usage. However, in order to enable this scheduling to be sufficiently fast to follow the dynamic variations, HSDPA requires that the scheduling is performed at the base station rather than by the RNC. Locating a scheduling function in the base station eliminates the requirement for communication over the base station to RNC interface (the Iub interface) thereby reducing the significant delays associated therewith.

In order for the scheduling to be efficient, the base station scheduler needs current information of the channel conditions. Accordingly, in a TDD HSDPA system, the mobile station provides information by transmitting this information to the base station using a channel which is controlled by the downlink scheduler. Uplink resources (denoted HS-SICH) are implicitly assigned when the UE receives an allocation for downlink HSDPA data, such that a positive or negative acknowledgement of that downlink data may be returned to the base station based downlink scheduler. In addition to transmitting the acknowledgement information on the implicitly-assigned uplink physical resources, the UE also includes current information of the channel conditions. Thus, information is transmitted to the scheduler on the HS-SICH which is set up and controlled by the scheduler controlling the HSDPA communication.

It has recently been proposed to introduce an uplink packet data service similar to HSDPA. In particular, such a service would utilise a base station based scheduler to schedule user data on an uplink packet channel. However, in order for such a system to operate efficiently it is necessary that the scheduler is provided with information from the UE with a minimum of delay. It has been proposed to provide this information by including the information with the uplink user data. Specifically, it has been proposed to piggyback the data on the used data packets by including such data in the MAC-e header of the uplink user data PDUs (Packet Data Units).

However, a solution where the signaling data is transmitted on a physical resource for which data is scheduled by the base station scheduler is suboptimal in many situations. In particular, it leads to an inflexible system and restricts the possible scheduling as the scheduler must also ensure that data packets are transmitted sufficiently often to allow the signaling information to be transmitted. Thus, whereas the solution may be practical in scenarios where there are sufficiently frequent uplink transmissions, it is not suitable for scenarios where UEs do not transmit packet data during relatively long intervals.

Figure 2:
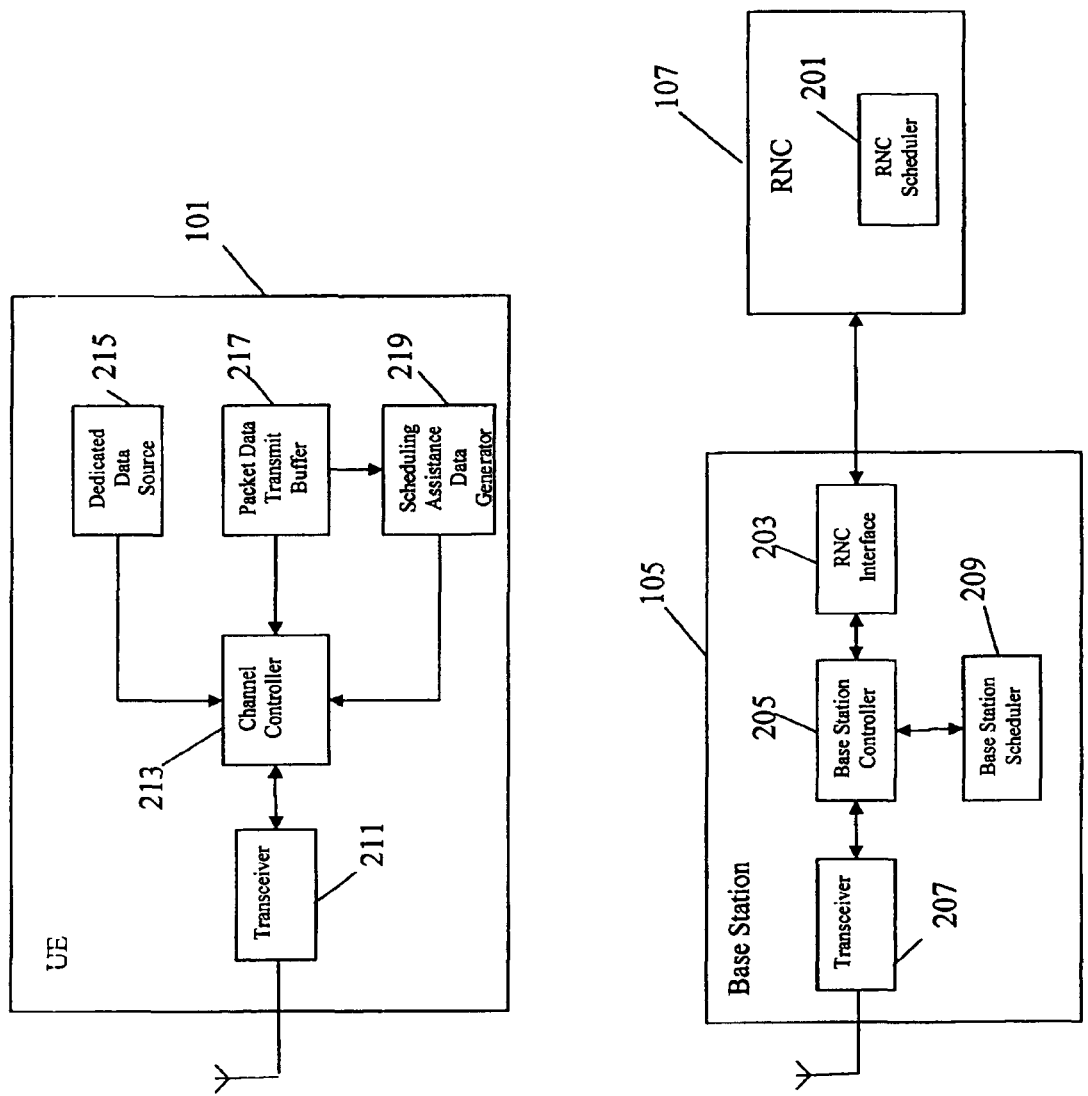
FIG. 2 illustrates a UE, an RNC and a base station in accordance with some embodiments of the invention.

FIG. 2 illustrates the UE 101, the RNC 107 and the base station 105 of the example of FIG. 1 in more detail. In the example, the RNC 107 comprises an RNC scheduler 201 which is responsible for scheduling conventional 3GPP physical channels such as for example a Dedicated Physical CHannel (DPCH) as will be known to the person skilled in the art. Thus, the RNC scheduler 201 schedules data for communication over the air interface as defined in Release 99 of the 3GPP technical specifications.

In the example of FIG. 2, the base station 105 comprises an RNC interface 203 which is responsible for communicating with the RNC 107 over the Iub interface. The RNC interface 203 is coupled to a base station controller 205 which controls the operation of the base station 105. The base station controller 205 is coupled to a transceiver 207 which is operable to communicate with the UE 101 over the air interface. The base station controller 205 performs all the functionality required for transmitting data received from the RNC 107 to the UE 101 as well as for receiving and forwarding data received from the UE 101 to the RNC 107.

The base station 105 furthermore comprises a base station scheduler 209 which is coupled to the base station controller 205. The base station scheduler 209 is responsible for scheduling data for an uplink shared packet data service. Specifically, the base station scheduler 209 schedules user data on a shared transport channel of a shared physical resource and generates resource allocation information for the shared physical resource. The allocation information is fed to the base station scheduler 209 and transmitted to the UEs 101, 103 over the air interface.

As the base station scheduler 209 is located in the base station 105, it can schedule data without the additional delay required for communication of allocation information over the Iub interface (as required for the RNC scheduler 201).

The base station scheduler 209 schedules data for the uplink transport channel based on different information. In particular, the base station scheduler 209 may schedule data in response to the individual air interface channel propagation characteristics and the current transmit buffer requirements of the UEs. Accordingly, this information is preferably obtained from scheduling assistance data which is transmitted to the base station 105 from the UEs 101, 103. In order to have an efficient scheduling, the scheduling assistance data is preferably received with low delay and frequent intervals. Accordingly, it is desirable that the scheduling assistance data is provided to the base station scheduler 209 without it first being transmitted to and received from the RNC 107 over the Iub interface.

In the example of FIG. 2, the UE 101 comprises a transceiver 211 which is operable to communicate with the base station 105 over the air interface in accordance with the 3GPP Technical Specifications. It will be appreciated the UE 101 furthermore comprises the required or desired functionality for a UE of a 3GPP cellular communication system.

The UE 101 comprises a channel controller 213 which is operable to allocate data to individual physical resources and transport channels corresponding to the 3GPP Technical Specifications. For example, the UE 101 may be involved in a circuit switched conventional Release 99 communication. Thus, the UE may comprise a dedicated data source 215 which generates user data to be transmitted to the RNC 107. The channel controller 213 is coupled to the dedicated data source 215 and may allocate the dedicated data to the appropriate channel such as the DCH (Dedicated CHannel). The channel controller 213 may further control the transmission of this to the base station in the appropriate physical channel, such as the DPCH (Dedicated Physical CHannel).

In the example, the UE 101 is furthermore involved in a packet data communication. For example, the UE 101 may be involved in an Internet access application supported by an uplink packet data service. In the example of FIG. 1, the UE 101 comprises a packet data transmit buffer 217 which stores the packet data until it is scheduled for transmission over the shared uplink channel. This scheduling is performed by the base station scheduler 209 rather than by the RNC scheduler 201.

The packet data transmit buffer 217 is coupled to a scheduling assistance data generator 219 which generates scheduling assistance data for transmission to the base station 105. In particular, the scheduling assistance data relates to information that is available at the UE 101 and which may be used by the base station scheduler 209 when scheduling data.

Specifically for FIG. 2, the scheduling assistance data generator 219 is coupled to the packet data transmit buffer 217 and obtains dynamic information of the current buffer loading from this. Thus, the scheduling assistance data generator 219 determines how much data is currently stored in the packet data transmit buffer 217 pending transmission over the uplink channel.

The scheduling assistance data generator 219 includes an indication of this pending transmit data amount in the scheduling assistance data. Furthermore, the scheduling assistance data generator 219 may be provided with information which is indicative of the current propagation conditions and may include this information in the scheduling assistance data. The propagation conditions for the shared physical resource may for example be determined from signal level measurements on received signals. In the example of a TDD system, this downlink propagation data may be considered applicable for the uplink propagation data as well since both uplink and downlink use the same frequency.

The scheduling assistance data generator 219 is coupled to the channel controller 213 which is arranged to transmit the scheduling assistance data from the UE 101 in a first physical resource of the uplink air interface. Thus, the channel controller 213 receives the scheduling assistance data from the scheduling assistance data generator 219 and causes this to be transmitted to the base station over a physical resource of the air interface.

In the example of FIG. 2, the channel controller 213 transmits the scheduling assistance data over a physical resource which is not managed by the base station based scheduler. In particular, the channel controller 213 selects a physical channel which is controlled by the RNC scheduler 201.

As an example, the channel controller 213 may transmit the scheduling assistance data on a dedicated physical resource used for a circuit switched voice call. Specifically, the channel controller may piggyback the scheduling assistance data together with a DPDCH which has been set up and is controlled by the RNC scheduler 201, onto DPCH physical resources assigned which are again set up and controlled by the RNC scheduler 201. As another example, the channel controller may transmit the scheduling assistance data on a Random Access CHannel (the PRACH channel).

When the communication is received at the base station 105, the base station controller 205 is in the example of FIG. 2 arranged to extract the scheduling assistance data and to feed it to the base station scheduler 209. For example, the base station controller 205 may monitor the DPDCH and/or the PRACH and when it detects that scheduling assistance data is being received, it may decode this data and send it to the base station scheduler 209.

It will be appreciated that in some embodiments, the RNC scheduler 201 may specifically allocate segments of the physical resource for the communication of scheduling assistance data and information identifying these segments may be communicated both to the base station 105 and the UE 101.

The scheduling assistance data is thus in this example received on a physical resource which is shared by other services supported by scheduling in the RNC. In some embodiments, the scheduling assistance data may be received on a physical resource which is supported by a different scheduler in the base station 105, such as in the case of HS-SICH for HSDPA. Specifically, these services may be conventional release 99, release 4 or release 5 services. Thus, an efficient and flexible communication of scheduling assistance data is achieved while maintaining backwards compatibility and avoiding the requirement of the base station scheduler 209 needing to allocate resource for scheduling assistance data. Rather, in many situations, unused resource of the RNC scheduled physical resources may be used for communication of scheduling assistance data.

Furthermore, the system of FIG. 2 allows a very fast communication of scheduling assistance data as the signaling avoids the delay inherent in communication over the Iub interface between the base station 105 and the RNC 107.

In the example, the base station scheduler 209 may be provided with scheduling assistance data indicative of the air interface channel conditions and the transmit data requirements of UEs 101, 103 at frequent intervals (due to the efficient resource utilization) and with very low delays. This allows a much faster scheduling taking into account fast varying characteristics and thus results in a much improved scheduling. This leads to an improved resource usage and increased capacity of the cellular communication system as a whole.

In the example of FIG. 2, the scheduling assistance data is communicated on a transport channel. A transport channel may be a channel that carries PDUs to and from the physical layer and the MAC layer. A physical channel carries bits over the air interface. A physical channel is specifically a Layer 1 (Physical layer) channel. A logical channel carries PDUs between the MAC layer and the RLC (Radio Link Control) layer.

Specifically, for 3GPP systems, a transport channel is an information-bearing interface between a 3GPP Multiple Access Control (MAC) entity, and a 3GPP physical layer entity. A physical channel is a unit of transmission resource, defined in 3GPP as a specific spreading code and period of time occupancy on the air interface; a unit of transmission resource. A logical channel is an information-bearing interface at the transmission input to the MAC.

In the specific example, the physical resource supports two or more transport channels which are multiplexed onto the same physical resource. Specifically, a new transport channel may be defined for communication of the scheduling assistance data and this transport channel may be multiplexed together with one or more DCH(s) onto one or more physical DPCH channels on which the DCH(s) are carried in a 3GPP system.

For a 3GPP system, two or more separate information streams may be multiplexed onto a common set of physical resources in several ways:

Physical Layer Field Multiplexing

For physical layer field multiplexing, the multiple information streams are separately encoded (if required) and occupy mutually exclusive (and usually contiguous) portions of the transmission payload. De-multiplexing is achieved by extracting the relevant portions of the transmission payload for each stream and treating them independently thereafter.

Transport Channel Multiplexing

For transport channel multiplexing, the multiple information streams are separately encoded and a coordinated rate matching scheme is applied to each stream such that the total number of bits after rate matching exactly fits the transmission payload. Generally, this is similar to physical layer multiplexing except that the bits corresponding to each information stream are usually non-contiguous in the final transmission payload. Additionally, the rate matching scheme is designed in such a way that the amount of FEC applied to each stream may be varied in a flexible manner, allowing for various and differing quality requirements to be met independently for each stream. De-multiplexing is enabled via the receiver having knowledge of the rate matching scheme algorithm applied in the transmitter.

Logical Channel Multiplexing

For logical channel multiplexing, the multiple information streams are multiplexed by the MAC layer prior to forward error correction encoding by the physical layer, with a header being applied to each stream to enable de-multiplexing in the receiver. FEC encoding is applied to the composite (multiplexed) stream, and so each stream will experience the same transmission reliability.

It will be appreciated that although the physical resource, such as the DPCH channel, is controlled by the RNC scheduler, the transport channel used for the scheduling assistance data is preferably terminated at the base station 105 while the dedicated transport channel, the DCH, is terminated at the RNC 107. Thus, although the transport channel used for the scheduling assistance data and the transport channel used for other data are multiplexed onto the same physical resource, they terminate in different entities. This may allow a particularly efficient and flexible signaling and may in particular minimize the delay for the scheduling assistance data. Specifically, it may avoid the delay associated with receiving the scheduling assistance data on a RNC terminated transport channel and retransmitting this to the base station 105.

It will be appreciated that the different physical resources controlled by the RNC 107 may be used to support the communication of the scheduling assistance data.

For example, as described, a DPCH or PRACH physical channel may be used. In some embodiments, the UE 101 and base station 105 may additionally comprise functionality for communicating the scheduling assistance data on a physical resource which is managed by the base station scheduler 209. Thus, in this example, the UE 101 may comprise functionality for communicating on a number of different physical resources. In the example of FIG. 2, a suitable physical resource on which to communicate the scheduling assistance data may be selected depending on the current conditions and operating environment and a suitable physical channel may be selected to provide the best performance for the current conditions.

Thus, in this example the signaling used to assist the enhanced uplink scheduling process by the base station scheduler 209 is intelligently routed and transmitted on different uplink physical resources according to the current preferences and conditions. In particular, a physical resource may be selected based on the presence or absence of those uplink physical resources. The scheduling assistance data may furthermore be communicated in a transport channel which is terminated in the base station 105.

In an alternative approach, the signaling used to assist the enhanced uplink scheduling process by the base station scheduler 209 may be routed and transmitted on different transport channels, and hence, physical resources, under the control of the network, via network-to-UE signaling means.

The intelligent-routing approach will be illustrated with reference to an example where three specific configurations are considered:

Scenario 1:

The user equipment 101 intends to inform the base station scheduler 209 about its current packet data transmit buffer status or radio conditions, yet no enhanced uplink resources have been granted for transmission and no other uplink radio resources are in existence or are available. This situation is common when the UE 101 has previously finished transmission of a packet call, has been idle for a period of time, and new data arrives in the UE's 101 packet data transmit buffer 217. The user must then inform the base station scheduler 209 of its need for transmission resources to transmit the new data.

Scenario 2:

The user equipment 101 intends to update the base station scheduler 209 with new air interface condition information or buffer information and packet data uplink resources scheduled by the base station scheduler 209 are already available. In this case, the UE 101 may piggyback the uplink signaling using a part of the resources granted for transmission of the uplink packet data transmission itself.

Scenario 3:

The user equipment 101 intends to update the base station scheduler 209 with new channel or buffer information, no packet data uplink resources managed by the base station scheduler 209 are available, yet other RNC managed uplink resources are in existence and are available. In this case, the UE 101 may piggyback the signaling using a part of the existing uplink resources.

Thus, in some embodiments the channel controller 213 of the UE 101 and the base station controller 205 of the base station 105 comprise functionality for selecting between different physical resources. Furthermore, this selection may be performed in response to whether the different physical resources are available.

As a specific example, the channel controller 213 may first evaluate if an uplink packet data channel controlled by the base station scheduler 209 is available. If so, this channel is selected for transmission of the scheduling assistance data. Otherwise, the channel controller 213 may evaluate if an uplink physical channel controlled by the RNC scheduler 201 is set up (such as a DPCH). If so, the scheduling assistance data is transmitted on this channel. However, if no such channel is available, the channel controller 213 may continue to transmit the scheduling assistance data using a random access channel (the PRACH).

In different embodiments, the selection of physical resources may be made in response to different parameters or characteristics. For example, the channel controller 213 and base station controller 205 may take into account parameters such as:

The presence or absence of uplink physical resource types.

The time since an uplink physical resource type was last present. For example, a given physical resource may be selected only if it has been available within a given time interval.

The traffic loading of channels mapped to the uplink resource types. For example, a physical resource may be selected if the traffic loading is so low that there is spare available resource.

A consideration of the transmission latency of the uplink signaling. For example, each physical resource may have an associated latency due to signaling delays, encoding etc. and the physical resource having the lowest latency may be selected in preference to other physical resources.

Alternatively or additionally, the selection of the physical resource may be performed in response to a configuration by the fixed network and in particular the RNC. For example, some signaling routes may be explicitly allowed or disallowed by the fixed network.

The selection of physical resources may for example be made by selecting a transport channel ani then selecting a physical resource on which to transmit this transport channel. As another example, the selection of physical resources may be made by having different transport channels linked to different physical channels and then selecting the appropriate transport channel.

Figure 3:
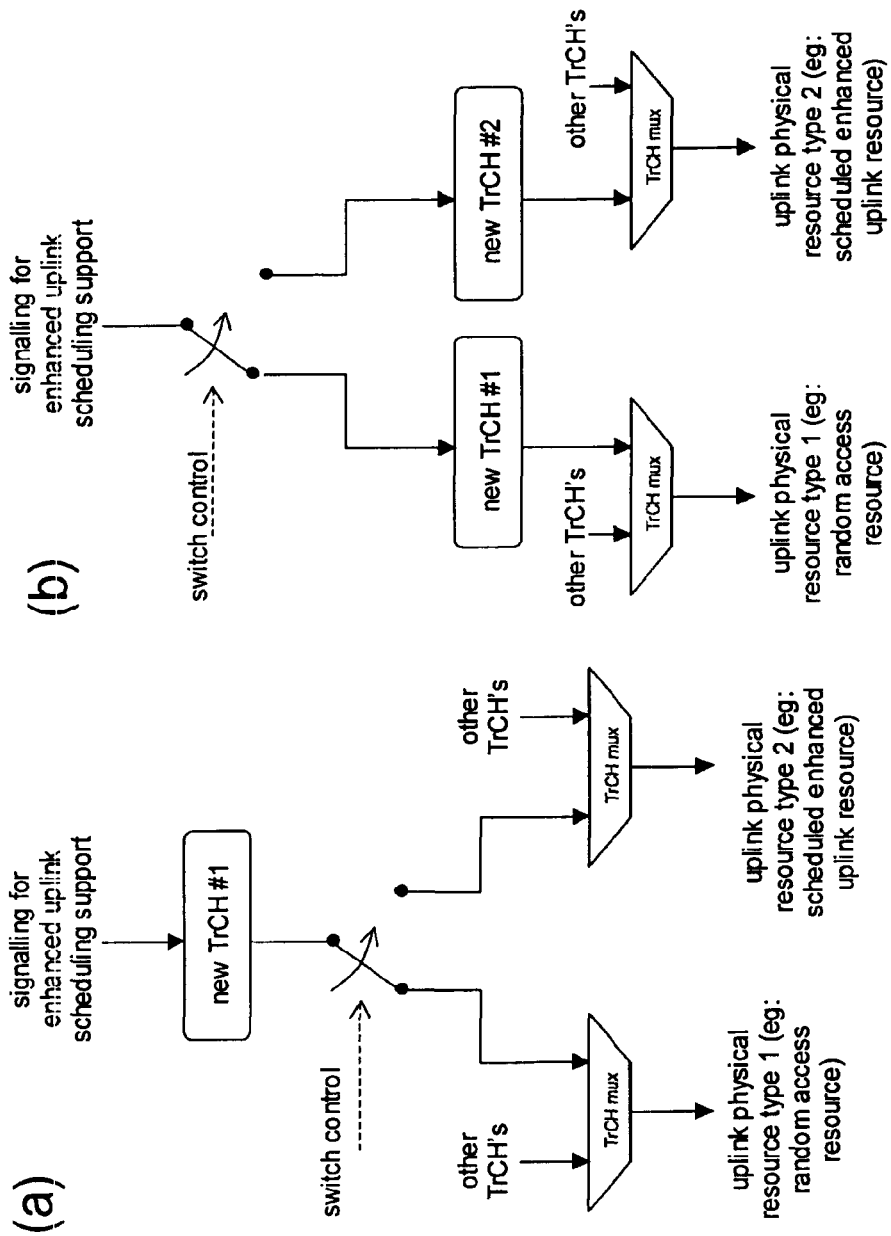
FIG. 3.a illustrates an example of the switching of a single transport channel between uplink physical resource types.

FIG. 3 illustrates the principles between these exemplary switching embodiments. In particular, FIG. 3a illustrates an example of the switching of a single transport channel between uplink physical resource types and FIG. 3.b illustrates an example of the switching of the signaling information stream into two or more transport channels each having a fixed association with a physical resource type.

In the example of FIG. 3a, the scheduling assistance data is included in a new transport channel (TrCH #1). The transport channel is then switched either to a first or second transport channel multiplexer depending on the desired physical resource type. The selected transport channel multiplexer multiplexes the transport channels with other transport channels to be communicated on the physical resource.

In the example of FIG. 3b, the scheduling assistance data is either included in a first transport channel (TrCH #1) or a second transport channel (TrCH #2). Each of the transport channels is supported by a different physical resource and the selected transport channel is multiplexed with other transport channels before being transmitted on the physical resource. The selection of the specific transport channel for the scheduling assistance data may be made in response to characteristics of the physical resources associated with the individual transport channels.

It will be appreciated that in the specific examples, transport channel multiplexing has been employed. Multiplexing of the transport channels provides a number of advantages and options particularly suitable for the described embodiments.

For example, in contrast to physical layer multiplexing it enables the uplink signaling to be multiplexed with legacy channels (e.g. Release 99 defined channels) without having a large impact on the 3GPP Technical Specifications.

Furthermore, existing approaches for transport channel multiplexing within 3GPP may be re-used with minimal impact on the Technical Specifications and thus improved backwards compatibility may be achieved.

Furthermore, usage of transport channel multiplexing may in some embodiments be used to individually optimize performance for the individual transport channels. In some embodiments, different transmission schemes are used for the different transport channels. In particular, different transmission schemes resulting in different transmission reliability may be used.

As a specific example, the forward error correction coding may be selected individually for each transport channel and for example a higher reliability forward error correction coding may be selected for the transport channel carrying the scheduling assistance data than far a transport channel carrying user data. This difference in forward error correction coding may be achieved by using different encoders/decoders or may be achieved by different puncturing or repetition characteristics being applied when performing rate matching.

In particular, one of the transport channels may employ a retransmission scheme where faulty data packets are retransmitted from the UE 101 whereas the other transport channel does not employ a retransmission scheme but rather transmits the data with a more reliable error coding. Thus, in this example, a single physical resource may comprise a first transport channel used for transmission of non-delay-sensitive data. The transmissions may have a high data packet error rate of, say, 10-30% resulting in a large number of retransmissions and thus increased delay but also in a very efficient resource utilization. At the same time, the physical resource may support a second transport channel used for the transmission of the scheduling assistance data and this transport channel may have a very low data rate thus ensuring that the packet data is received reliably and thus minimizing delay resulting in improved scheduling by the base station scheduler 209.

Furthermore, in some embodiments the transport channels of the physical resource may be terminated at different points in the fixed network. Specifically, a transport channel may be used for user data communication and may be terminated at the RNC 107 while a second transport channel is used for communication of the scheduling assistance data and is terminated in the base station 105. Thus, the same physical resource may support transport channels which are individually terminated at the optimum location. This may reduce delays associated with the scheduling assistance data and may improve the scheduling performance of the base station scheduler 209.

Figure 4:
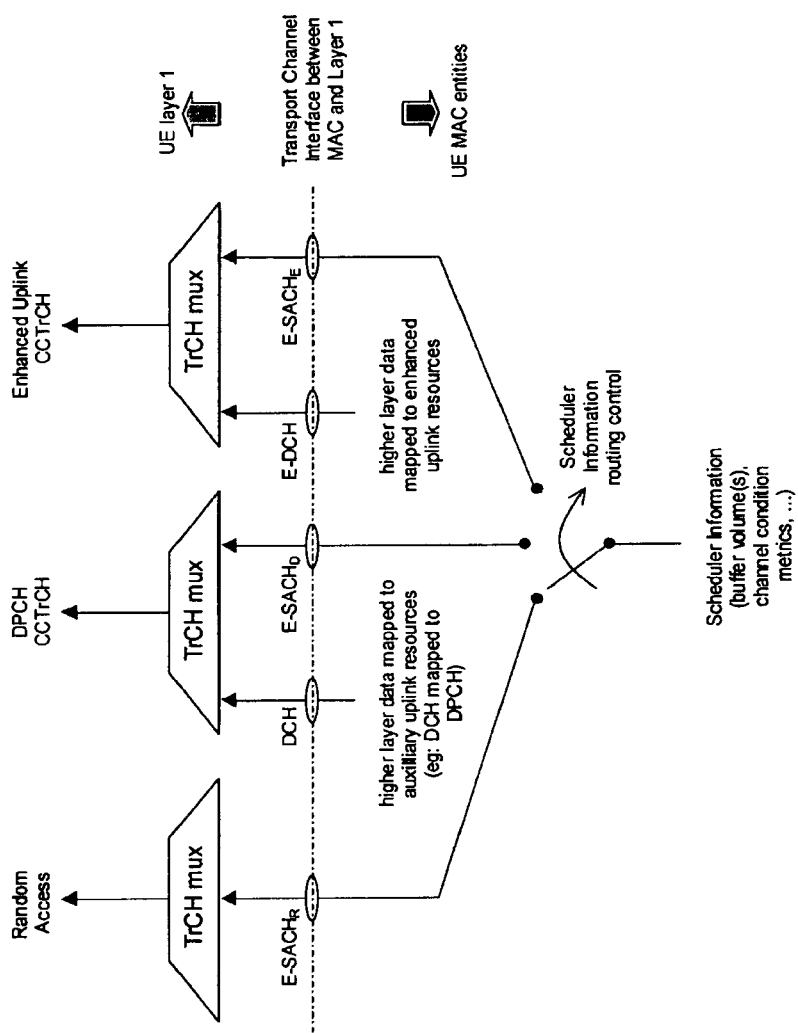
FIG. 4 illustrates and example of a signaling system in accordance with some embodiments of the invention.

FIG. 4 illustrates an example of a signaling system in accordance with some embodiments of the invention. The illustrated functionality may specifically be implemented in the channel controller 213 of FIG. 2. The operation will be described with reference to the three specific exemplary 3GPP UTRAN TDD scenarios previously described.

Scenario 1

In scenario 1, due to the fact that the existing RACH is terminated in the RNC 107, the base station 105 cannot make use of this transport channel to carry the necessary uplink signaling. The RACH is not "visible" to the base station 105 and simply passes through it on its way to the RNC. It would be possible to forward the received information back from the RNC to the Node-B via new Iub signaling although this technique suffers greatly from the latency involved in these multiple transmission legs.

Non-random-access methods may also be considered (such as circular polling) but such techniques again suffer from potential latency increases (there is a potential significant delay between data arriving in the user's transmission buffer(s) and uplink resources being granted to serve that data).

In accordance with the example of FIG. 4, a new base station terminated random access channel which is able to convey the scheduling assistance data directly to the base station scheduler 209 is defined.

The new random access channel is termed "E-SACH$_R$" (Enhanced Uplink Scheduler Assistance Channel) in the example of FIG. 4. The "R" subscript relates to the fact that the channel is random access in nature (ie: non-scheduled and in particular not scheduled or managed by the base station scheduler 209). The channel is able to carry an indication to the base station scheduler 209 that new data has arrived in the user's transmission buffer and is in effect a request for uplink radio resources. It may also carry an indication of the current channel conditions and, because the transmission is random access, it may also carry an indication of the user identity such that the base station scheduler 209 knows which user to allocate the resources to.

Scenario 2

With the uplink data payload being carried on one transport channel scheduled by the base station scheduler 209 (denoted the Enhanced-Dedicated CHannel-E-DCH), the uplink signaling may be carried on a separate transport channel (denoted E-SACH$_E$ in FIG. 4). Like E-SACH$_R$, E-SACH$_E$ is terminated at the base station 105. The "E" subscript is used to denote that the scheduling assistance information is piggybacked on the enhanced uplink transmission scheduled by the base station scheduler 209. However, because it is conveyed on a scheduled transmission, the need to carry the user identity in the signaling is obviated. Thus, the PDU size of an E-SACH$_E$ PDU is likely to be different to that of an E-SACH$_R$ PDU. The two (or more) transport channels are multiplexed onto the same set of physical resources (termed a CCTrCH). Furthermore, it is possible to adjust the degree of FEC coding applied to E-SACH$_E$ and E-DCH, to optimize the transmission reliability of each transport channel as desired. For example, it may be desirable for the E-SACH$_E$ to be given a higher degree of FEC protection than the E-DCH, such that the scheduler information gets to the scheduler with high reliability (usually in a single transmission) whilst the E-DCH is able to utilize the ARQ (retransmission) efficiencies by operating each transmission instance at optimum link reliability (often involving multiple transmissions per unit of data before it is received without error).

Scenario 3

This scenario is similar to that of scenario 2, with the key difference being that the uplink signaling is piggybacked on uplink resources which are not directly associated with the enhanced uplink transmission and which are not scheduled by the base station scheduler 209. These uplink resources are here termed "auxiliary". For example, enhanced packet data uplink may be used in conjunction with the HSDPA downlink packet data service. In such a case an associated uplink DCH exists (typically used to carry higher layer user data such as TCP (Transmit Power Control) acknowledgements, and layer 3 control traffic to control events (such as handovers). The scheduling assistance data may in such a case be transmitted on uplink DPCH physical resources or on another uplink HSDPA channel such as the HS-SICH (High Speed-Shared Information Channel).

When no other uplink transmission resources are available, but there is a need to send updated information to the scheduler, it may be preferable (for latency reasons or to reap efficiency savings) for the user to piggyback the uplink signaling of scheduling assistance data onto the auxiliary uplink resources, rather than using the E-SACH$_R$ random access procedures.

Again, in order to facilitate control over the degree of forward error correcting coding applied to the auxiliary traffic and the uplink signaling, and to enable separate detection of each, a separate transport channel is used for the uplink signaling, termed the E-SACH$_D$. As in scenario 2, the E-SACH$_D$ is terminated at base station 105 and is multiplexed together with other data onto a common set of auxiliary uplink radio resources (the auxiliary uplink CCTrCH).

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

The invention claimed is:

1. A user equipment for transmitting uplink signalling information in a cellular communication system, the user equipment comprising:
   a scheduling assistance data generator configured for generating scheduling assistance data for a base station based scheduler, the scheduling assistance data relating to physical resource allocation for uplink packet data transmission from the user equipment;
   a transmitter operable to transmit the scheduling assistance data from the user equipment in a first physical resource of an uplink air interface and operable to transmit the scheduling assistance data using a second physical resource of the uplink air interface, wherein the first physical resource is arranged to provide an identifier of the user equipment and is not scheduled by the base station based scheduler and the second physical resource is an uplink channel operable to convey data from a layer higher than a physical layer in addition to the scheduling assistance data, wherein the second physical resource is shared amongst a plurality of user equipment; and
   a channel controller operable to select between the first physical resource and the second physical resource in response to a resource availability of the first physical resource and the second physical resource to transmit the scheduling assistance data.

2. A user equipment according to claim 1, wherein the transmitter is configured to transmit the scheduling assistance data on a first channel supported by the first physical resource.

3. A user equipment according to claim 2, wherein the first channel is a base station terminated channel terminated in a base station of the base station based scheduler.

4. A user equipment according to claim 1, wherein the data from a layer higher than the physical layer has a different termination point than the scheduling assistance data.

5. A user equipment according to claim 1, wherein the data from a layer higher than the physical layer employs a retransmission scheme and the scheduling assistance data does not employ the retransmission scheme.

6. A user equipment according to claim 1, wherein the data from a layer higher than the physical layer is encoded in accordance with a first transmission scheme and the scheduling assistance data is encoded in accordance with a different second transmission scheme.

7. A user equipment according to claim 6, wherein the first transmission scheme and second transmission scheme comprise different error correcting characteristics.

8. A user equipment according to claim 1, wherein the channel controller is configured to select between the first physical resource and the second physical resource in response to a lack of resource allocation of either the first physical resource or the second physical resource.

9. A user equipment according to claim 1, wherein the channel controller is configured to select between the first physical resource and the second physical resource in response to a latency characteristic associated with the first physical resource and the second physical resource.

10. A user equipment according to claim 1, wherein the first physical resource is associated with a first channel and the second physical resource is associated with a second channel and the scheduling assistance data generator is configured to allocate the scheduling assistance data by associating the scheduling assistance data with the first or second channel.

11. A user equipment according to claim 3, wherein the first physical resource is a random access channel and the first channel is a higher layer channel mapped onto the random access channel.

12. A user equipment according to claim 1, wherein the scheduling assistance data comprises an indication of an amount of data pending transmission.

13. A user equipment according to claim 1, wherein the cellular communication system is a Universal Mobile Telecommunication System.

14. A user equipment according to claim 1, wherein the data from a layer higher than the physical layer comprises acknowledgment data for downlink packet data.

15. A method of transmitting uplink signalling information in a cellular communication system, the method comprising:
   generating scheduling assistance data for a base station based scheduler, the scheduling assistance data relating to physical resource allocation for uplink packet data transmission from a user equipment;
   selecting between a first physical resource and a second physical resource in response to a resource availability characteristic of the first physical resource and the second physical resource; and
   if the first physical resource is selected, transmitting the scheduling assistance data from the user equipment using the first physical resource of an uplink air interface, wherein the first physical resource is operable to indicate an identifier of the user equipment and is not scheduled by the base station based scheduler, and
   if the second physical resource is selected, transmitting the scheduling assistance data from the user equipment using the second physical resource of the uplink air interface, wherein the second physical resource is an uplink channel operable to convey data from a layer higher than a physical layer in addition to the scheduling assistance data, and wherein the second physical resource is shared amongst a plurality of user equipment.

16. A method according to claim 15, wherein transmitting the scheduling assistance data comprises transmitting the scheduling assistance data on a first channel supported by the first physical resource.

17. A method according to claim 16, wherein the first channel is terminated in a base station of the base station based scheduler.

18. A method according to claim 15, wherein the data from a layer higher than the physical layer is encoded in accordance with a first transmission scheme and the scheduling assistance data is encoded in accordance with a different second transmission scheme.

19. A method according to claim 15, wherein the second physical resource is a physical resource managed by the base station based scheduler.

20. A method as claimed in claim 15, wherein the first physical resource is a random access channel and the first channel is a higher layer channel mapped onto the random access channel.

21. A method according claim 15, wherein the selecting between the first physical resource and the second physical resource is in response to a traffic loading of the first physical resource and the second physical resource.

22. A method according to claim 15, wherein the selecting between the first physical resource and the second physical resource is in response to a lack of resource allocation of either the first physical resource or the second physical resource.

23. A method according to claim 15, wherein the scheduling assistance data comprises an indication of an amount of data pending transmission.

24. A method according to claim 15, wherein the cellular communication system is a Universal Mobile Telecommunication System.

25. A method according to claim 15, wherein the data from a layer higher than the physical layer comprises acknowledgment data for downlink packet data.

* * * * *